United States Patent [19]
Nishiguchi

[11] Patent Number: 5,566,343
[45] Date of Patent: Oct. 15, 1996

[54] SERIAL DATA TRANSFER APPARATUS FOR DETERMINING A RECEPTION TIME AND A TRANSMISSION TIME

[75] Inventor: Yukihiro Nishiguchi, Tokyo, Japan

[73] Assignee: NEC Corporation, Tokyo, Japan

[21] Appl. No.: 412,856

[22] Filed: Mar. 29, 1995

Related U.S. Application Data

[63] Continuation of Ser. No. 31,886, Mar. 16, 1993, abandoned.

[30] Foreign Application Priority Data

Mar. 17, 1992 [JP] Japan .................................. 4-060588

[51] Int. Cl.$^6$ .................................................. G06F 13/00
[52] U.S. Cl. .......................... 395/800; 395/280; 364/284; 364/DIG. 1
[58] Field of Search .................................... 395/800, 880; 364/284, DIG. 1

[56] References Cited

U.S. PATENT DOCUMENTS

| | | | |
|---|---|---|---|
| 4,298,978 | 11/1981 | Nakamura | 370/92 |
| 4,932,024 | 6/1990 | Bonicioli et al. | 370/85.9 |
| 4,989,223 | 1/1991 | Katayose et al. | 377/39 |
| 5,223,826 | 6/1993 | Amou et al. | 340/825.06 |

FOREIGN PATENT DOCUMENTS

| | | |
|---|---|---|
| 0021723 | 6/1980 | European Pat. Off. . |
| 0239937 | 3/1987 | European Pat. Off. . |
| 61-201338 | 6/1986 | Japan . |
| 2177877 | 1/1987 | United Kingdom . |

OTHER PUBLICATIONS

NEC Corporation, "User's Manual µPD7801xSeries 8-Bit Single-Chip Microcomputer", Document No. IEU-1343, Jun., 1992.

*Primary Examiner*—Alyssa H. Bowler
*Assistant Examiner*—John Harrity
*Attorney, Agent, or Firm*—Popham Haik Schnobrich & Kaufman, Ltd.

[57] ABSTRACT

A serial data transfer apparatus includes a time base counter that counts by a clock signal (CLK). The count value of the time base counter at the point of time when the reception of the serial data (RxD) is completed is written into the reception buffer together with the reception data. Accordingly, in the central processing unit, when the reception data (RxD) is to be processed, the time difference since the reception serial data (RxD) can be detected by reading out the count value of the time base counter written in the reception buffer and by reading out the count value of the time base counter at present from the time base counter. Accordingly, time management of the reception data can be performed.

5 Claims, 10 Drawing Sheets

SERIAL DATA TRANSFER APPARATUS FOR DETERMINING A RECEPTION TIME AND A TRANSMISSION TIME

This is a continuation of U.S. patent application Ser. No. 08/031,886, filed Mar. 16, 1993, now abandoned.

BACKGROUND OF THE INVENTION

The present invention relates to a serial data transfer apparatus for use in the field of serial data communications wherein serial data is transferred in accordance with predetermined rules, that is, protocol.

An example of a configuration of a serial data reception circuit employed by a conventional serial data transfer apparatus is described with reference to FIG. 1 by way of an example of the case wherein serial data received by the serial data transfer apparatus (the data is hereinafter referred to as "reception serial data") is sent to a central processing unit of a microcomputer.

The serial data reception circuit includes a reception buffer 1 connected to the central processing unit of the microcomputer (not shown in FIG. 1) through a data bus 7, a shift clock generation circuit 10, a shift register 2, a control circuit 3, a pointer 4, an input buffer 5, a multiplexer 6 connected to the central processing unit through an address bus 8, and a reception serial data input terminal 9. It is to be noted that, according to the protocol of reception serial data (R×D), as seen in FIG. 2(a), a falling edge of the reception serial data (R×D) indicates the starting position of the serial data communication, and first to third units of reception data $D_{R1}$-$D_{R3}$, each of which consists of 8 bits, are transferred serially following the falling edge. The period for which the first unit of reception data $D_{R1}$ consisting of 8 bits is transferred is called a first reception frame $F_{R1}$; the period for which the second unit of reception data $D_{R2}$ consisting of 8 bits is transferred is called a second reception frame $F_{R2}$; and the period for which the third unit of reception data $D_{R3}$ consisting of 8 bits is transferred is called a third reception frame $F_{R3}$.

In the serial data reception circuit, the reception serial data (R×D) is inputted from the reception serial data input terminal 9 to the input buffer 5 and then inputted from the input buffer 5 to the shift clock generation circuit 10, the shift register 2 and the control circuit 3. In the shift clock generation circuit 10, a shift clock signal (SCK) synchronized with the reception serial data (R×D) is generated from the falling edge of the reception serial data (R×D) by using a system clock signal (C1) inputted thereto from the outside. When the falling edge of the reception serial data (R×D) is detected, the control circuit 3 executes the initialization of the communication control thereof, and a clear signal (CLR) for initializing the pointer 4 which designates an address of the reception buffer 1 is outputted from the control circuit 3 to the shift clock generation circuit 10 and a clear terminal CLR' of the pointer 4 as shown in FIG. 2(c). In the shift register 2, the reception serial data (R×D) is shifted one bit at a time in synchronism with a shift clock signal (SCK) transmitted thereto from the shift clock generation circuit 10 so that the first unit of reception data $D_{R1}$ is fetched into the shift register 2. In this instance, the control circuit 3 calculates the shift amount of the shift register 2 by using the shift clock signal (SCK) transmitted thereto from the shift clock generation circuit 10. At the point of time when the calculated shift amount becomes equal to "8," an increment/write control signal (INC/WR) of high level is outputted from the control circuit 3 to a write control signal input terminal WR of the reception buffer 1 and an increment control signal input terminal INC of the pointer 4 as shown in FIG. 2(b). Here, the increment/write control signal (INC/WR) is a signal to write data in the shift register 2 into the reception buffer 1 and increment the address of the reception buffer 1 designated by the pointer 4. As a result, the first unit of reception data $D_{R1}$ is written into the address designated by the pointer 4 of the reception buffer 1.

Thereafter, the second unit of reception data $D_{R2}$ and the third unit of reception data $D_{R3}$ are successively written into the reception buffer 1 in a similar manner as in the case of the first unit of reception data $D_{R1}$. After the writing of the third unit of reception data $D_{R3}$ into the reception buffer 1 is completed, an interrupt requesting signal (INT) of high level representing that the reception of all of the reception serial data has been completed is generated in the control circuit 3 as shown in FIG. 2(d) and then outputted from the control circuit 3 to the central processing unit. When the interrupt requesting signal (INT) is inputted, the central processing unit reads out the designated address of the reception buffer 1 through the address bus (not shown in FIG. 1). A read-out control signal (R×BRD) of high level is outputted from the central processing unit to a read-out control signal input terminal RD of the reception buffer 1 and the multiplexer 6, and an address signal is outputted from the central processing unit to an address signal input terminal AD of the reception buffer 1 through the address bus 8 and the multiplexer 6. Consequently, the first to third units of reception data $D_{R1}$-$D_{R3}$ written in the reception buffer 1 are read out from the reception buffer 1 to the central processing unit through the data bus 7.

In recent years, systems which employ a large number of microcomputers have been increasing in number. In such a system, the entire system must operate in a synchronized condition. To this end, communications of data are performed very frequently and closely between the microcomputers. In order to allow a plurality of microcomputers to operate closely and efficiently, time management is required for communications of data generally since communications of real time data increase. It is to be noted that real time data signifies data which varies with respect to time.

A microcomputer requires, depending upon the program being executed, a certain interval of time until reading out processing of data of the reception buffer 1 is performed actually after the interrupt requesting signal (INT) is accepted. When this time difference exists, some correction is necessary when the real time data to be transferred is to be processed. Further, when serial data is communicated in a fixed period, the microcomputer must know at which time the reception serial data stored in the reception buffer 1 was communicated and execute processing of the reception serial data read out from the reception buffer 1 in accordance with the time.

However, the conventional serial data transfer apparatus described above is disadvantageous in that, when the reception serial data is to be received, only the interrupt requesting signal (INT) of high level is generated, and consequently, the time management of the reception serial data is impossible and the control essential to communications of the real time data cannot be performed. Further, when the serial data is to be transmitted, it is necessary to recognize the time for which the transmission has actually been performed and correct a serial data to be transmitted next in accordance with the time. However, since the conventional serial data transfer apparatus cannot perform the control just described, it is disadvantageous also in that the transmission of real time data cannot be performed.

SUMMARY OF THE INVENTION

An object of the present invention to provide a serial data transfer apparatus by which the transmission and reception of real time data can be performed readily.

Other objects of the present invention will become obvious from the following description.

In accordance with an aspect of the present invention, there is provided a serial data transfer apparatus comprising a serial data reception circuit which performs management of reception time and receives serial data in accordance with predetermined rules.

In accordance with an aspect of the present invention, there is also provided a serial data transfer apparatus comprising a serial data transmission circuit which performs management of transmission time and transmits serial data in accordance with predetermined rules.

BRIEF DESCRIPTION OF THE DRAWINGS

The features and advantages of the present invention will become apparent from the following description when taken in conjunction with the accompanying drawings in which.

DESCRIPTION OF THE PREFERRED EMBODIMENTS

Figure 1:
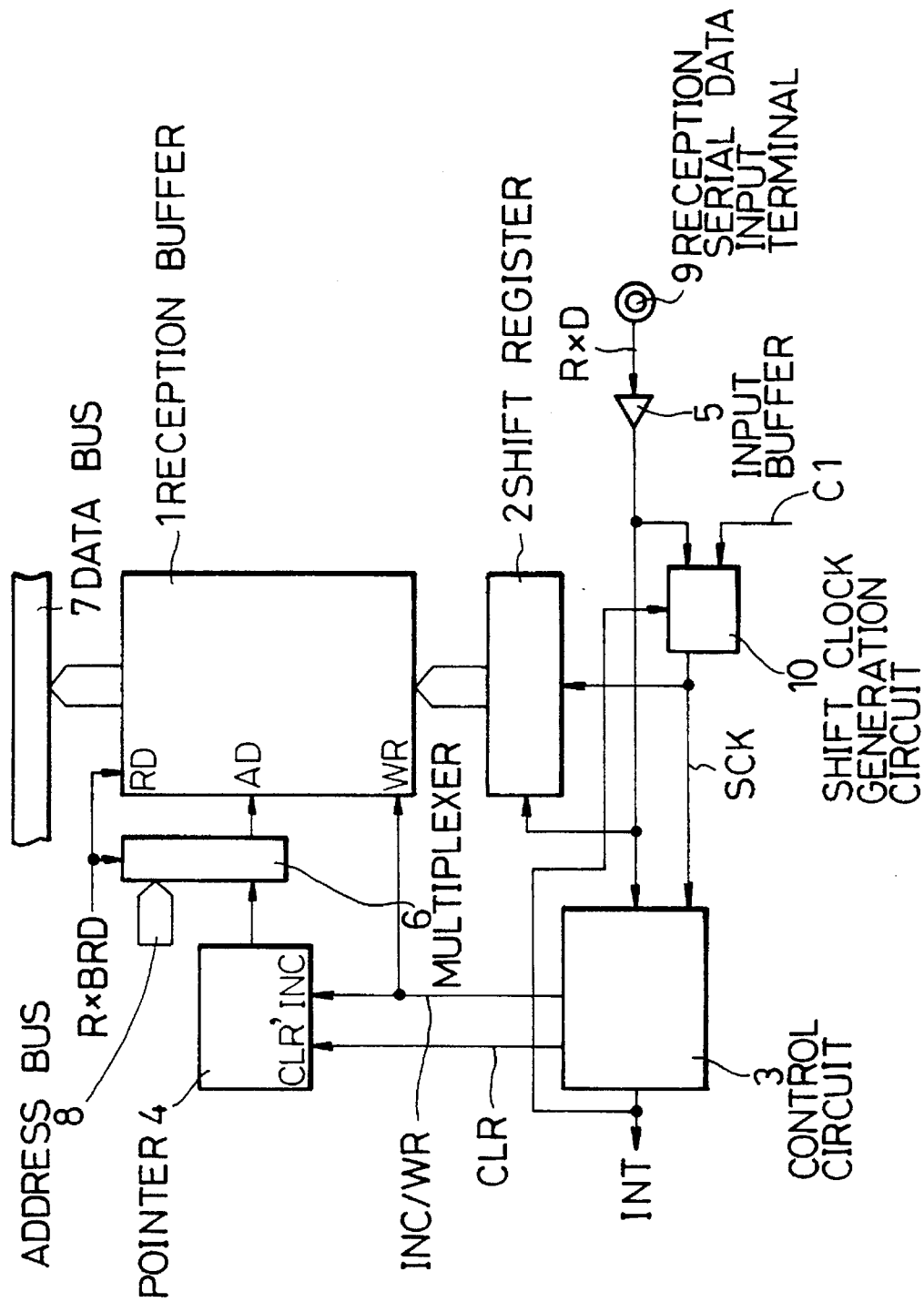
FIG. 1 is a block diagram showing an example of a serial data reception circuit of a conventional serial data transfer apparatus.
Figure 2:
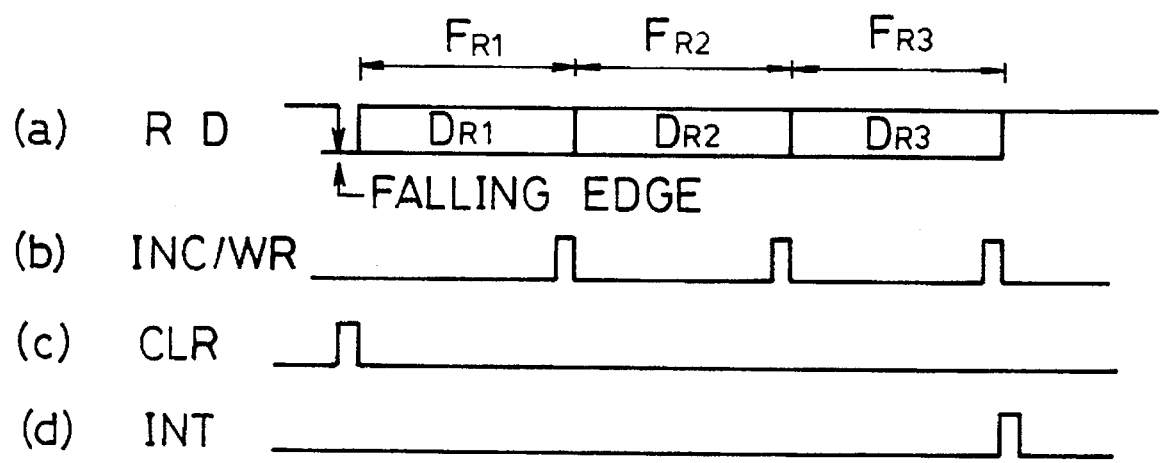
FIG. 2 is a timing chart illustrating operation of the serial data reception circuit shown in FIG. 1.
Figure 3:
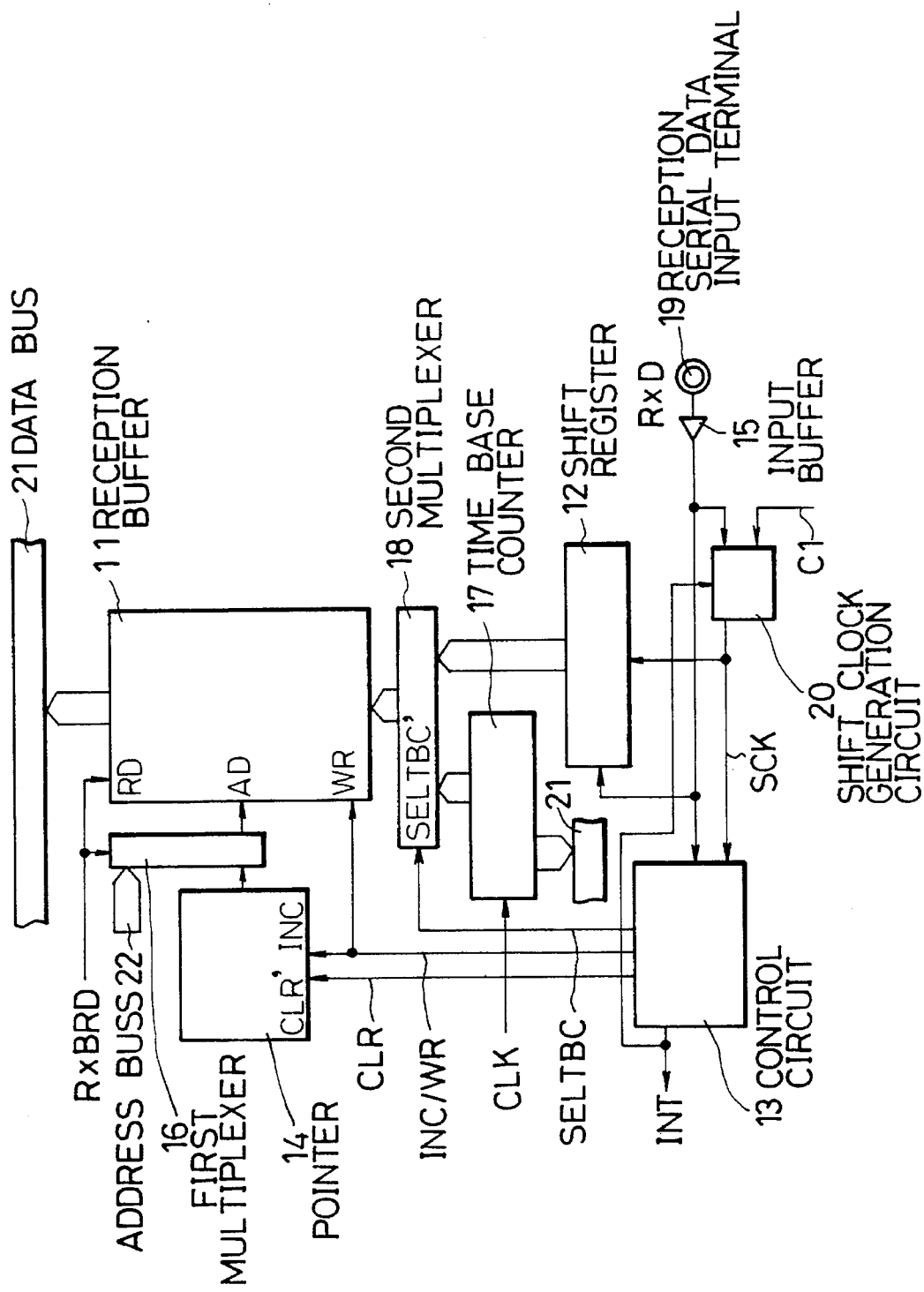
FIG. 3 is a block diagram showing a serial data reception circuit illustrating a first embodiment of a serial data transfer apparatus of the present invention.

A serial data reception circuit of a serial data transfer apparatus according to the first embodiment of the present invention includes, as shown in FIG. 3, a reception serial data input terminal 19, an input buffer 15, a shift clock generation circuit 20, a shift register 12, a control circuit 13, a time base counter 17, a second multiplexer 18, a reception buffer 11, a pointer 14, and a first multiplexer 16.

Figure 6:
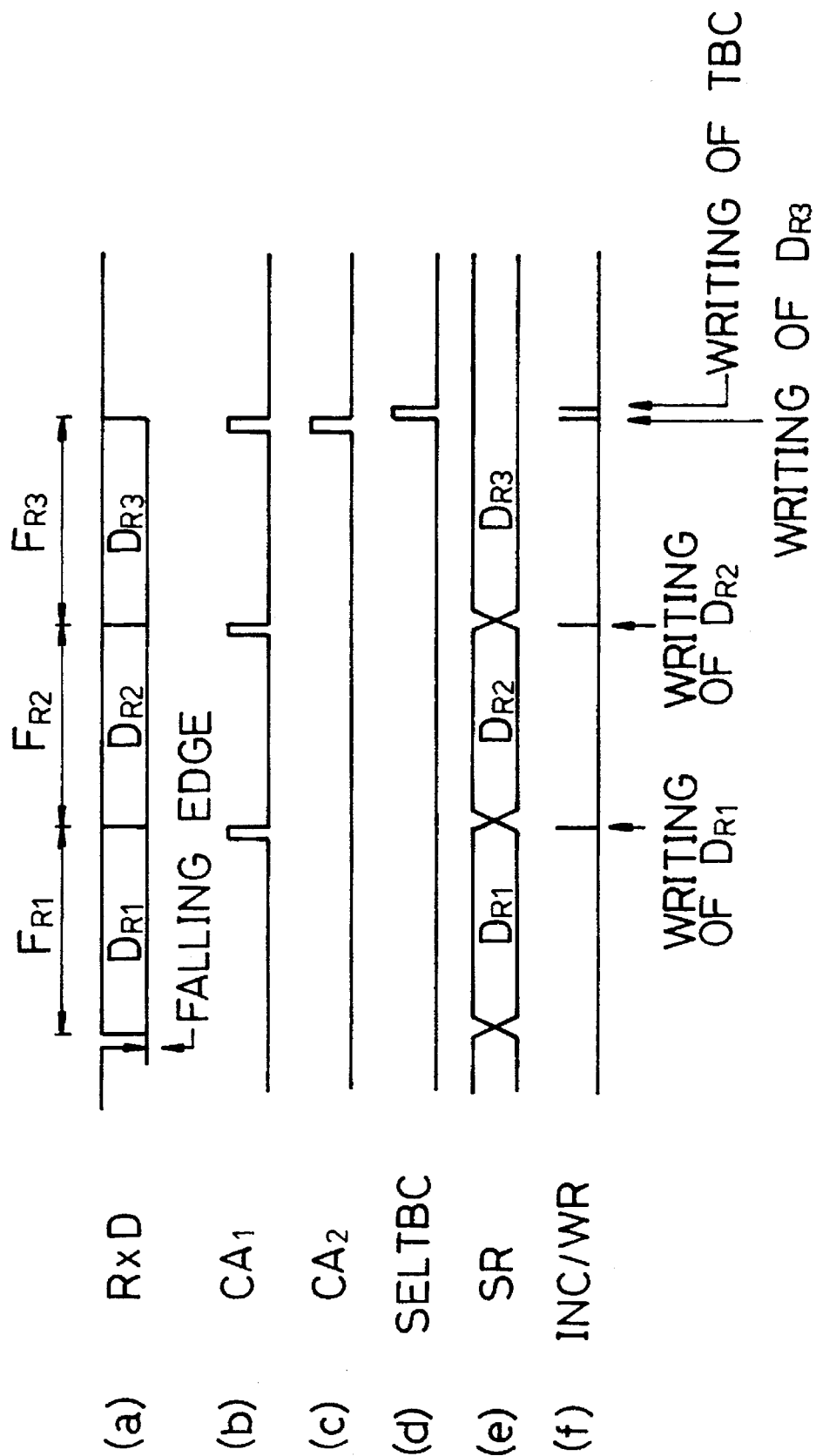
FIG. 6 is a timing chart illustrating operation of the serial data reception circuit shown in FIG. 3.

The input buffer 15 receives a reception serial data (RxD) which is inputted from the outside to the reception serial data input terminal 19. It is to be noted that, according to the protocol of the reception serial data (RxD), as shown in FIG. 6(a), a falling edge of the reception serial data (RxD) indicates the starting position of the serial data communication, and first to third units of reception data $D_{R1}$-$D_{R3}$ each consisting of 8 bits are transferred serially following the falling edge.

Figure 4:
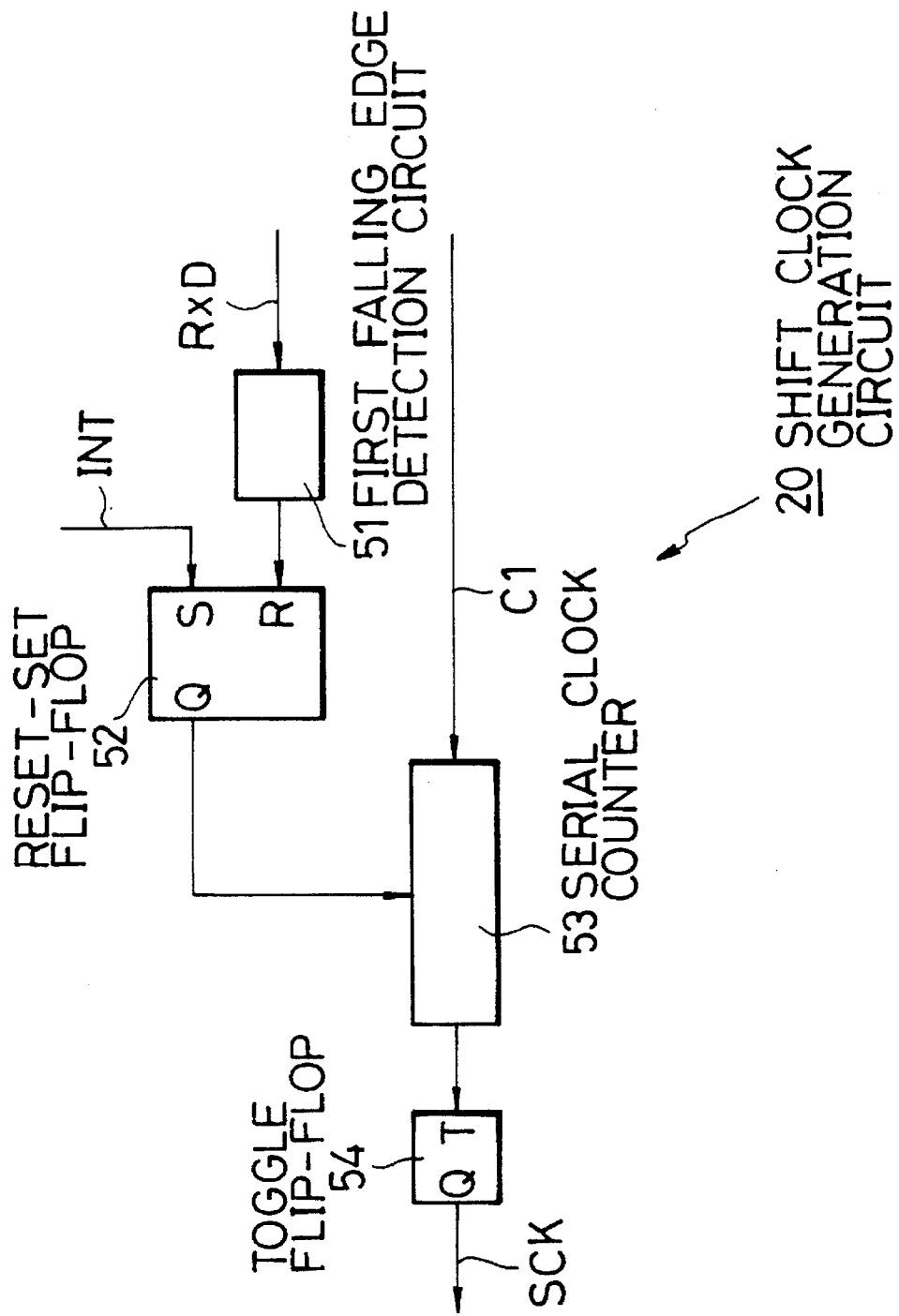
FIG. 4 is a block diagram of the shift clock generation circuit shown in FIG. 3.

The shift clock generation circuit 20 generates a shift clock signal (SCK), which is indicative of a communication rate and is synchronized with the reception serial data (RxD) received from the input buffer 15, by using a system clock signal (C1) transmitted thereto from the outside. The shift clock generation circuit 20 includes, as shown in FIG. 4, a first falling edge detection circuit 51, a reset-set flip-flop 52, a serial clock counter 53, and a toggle flip-flop 54. The first falling edge detection circuit 51 detects the falling edge of the reception serial data (RxD) received from the input buffer 15. The reset-set flip-flop 52 is set by an interrupt requesting signal (INT) inputted to a set terminal S thereof from the control circuit 13 and is reset by a signal inputted to a reset terminal R thereof from the first falling edge detection circuit 51. The serial clock counter 53 counts the number of pulses of the system clock signal (C1) received from the outside when an output signal of the reset-set flip-flop 52 transmitted to the reset terminal R thereof is low level. It is to be noted that, since the output signal of the reset-set flip-flop 52 normally is high level, the serial clock counter 53 is in a reset state and is held from operation. The toggle flip-flop 54 reverses the polarity of an output signal thereof each time the output signal of the serial clock counter 53 transmitted to a toggle terminal T thereof changes from low level to high level.

When the falling edge of the reception serial data (RxD) is detected by the first falling edge detection circuit 51, the reset-set flip-flop 52 is reset by the output signal of the first falling edge detection circuit 51 so that the output signal of the reset-set flip-flop 52 changes from high level to low level. Consequently, the serial clock counter 53 starts counting the number of pulses of the system clock signal (C1). After the number of pulses of the system clock signal (C1) corresponding to the length of a half bit of the reception serial data (RxD) is counted, the output signal of high level is outputted from the serial clock counter 53 to the toggle terminal T of the toggle flip-flop 54 so that the polarity of the output signal of the toggle flip-flop 54 is reversed. Thereafter, when the serial clock counter 53 counts the number of pulses of the system clock signal (C1) corresponding to the length of a half bit of the reception serial data (RxD), the output signal of high level is outputted from the serial clock counter 53 to the toggle terminal T of the toggle flip-flop 54 so that the polarity of the output signal of the toggle flip-flop 4 is reversed. As the mentioned operation is repeated, the shift clock signal (SCK) is generated which is synchronized with the reception serial data (RxD) and has one pulse for each bit of the reception serial data (RxD).

The shift register 12 shifts and fetches the reception serial data (RxD) received from the input buffer 15 one bit at a time in synchronism with the shift clock signal (SCK) received from the shift clock generation circuit 20, and converts the fetched reception serial data (RxD) into parallel data.

Figure 5:
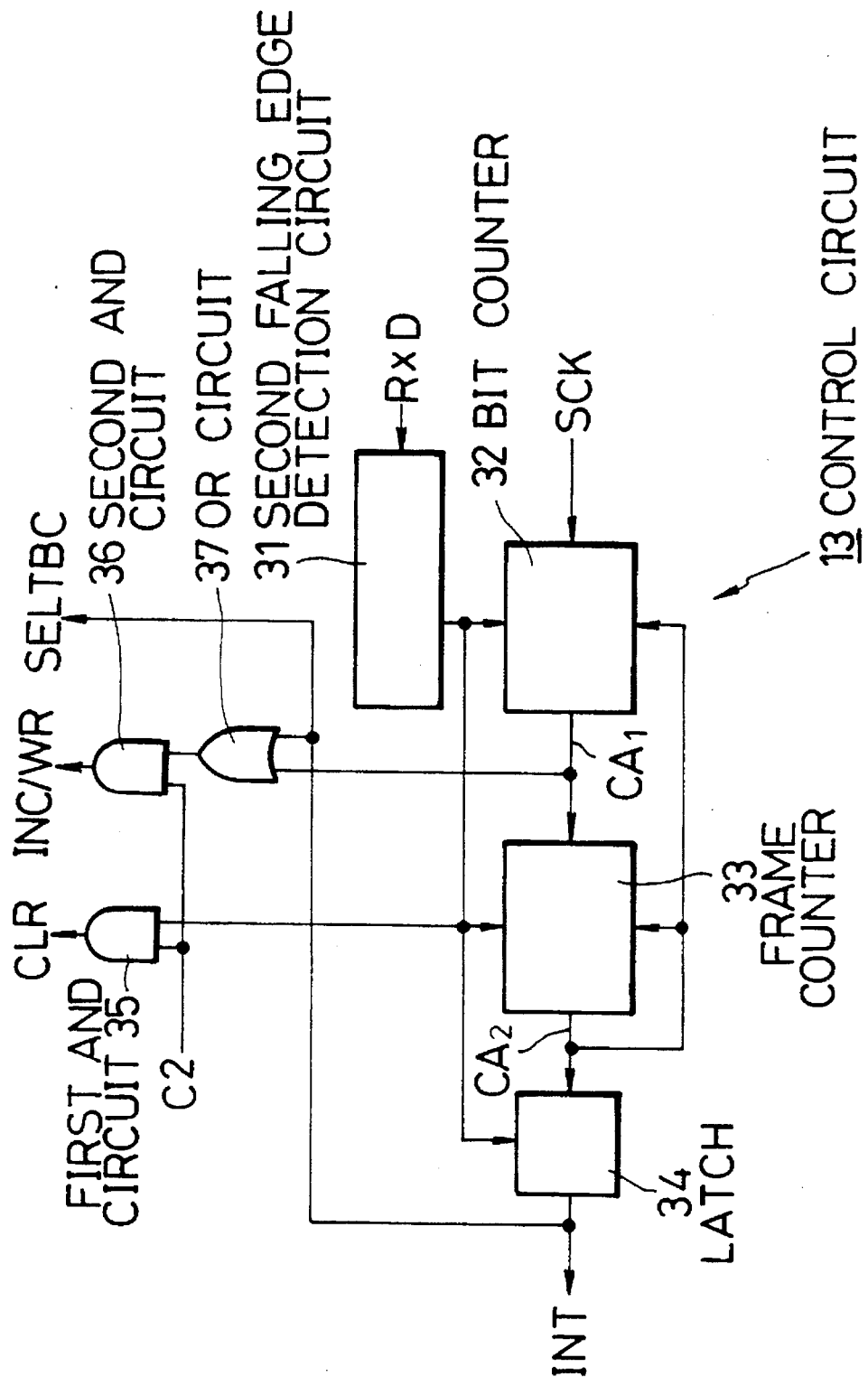
FIG. 5 is a block diagram showing the control circuit shown in FIG. 3.

The control circuit 13 includes, as shown in FIG. 5, a second falling edge detection circuit 31, a bit counter 32, a frame counter 33, a latch 34, a first AND circuit 35, a second AND circuit 36, and an OR circuit 37. The second falling edge detection circuit 31 receives the reception serial data (RxD) from the input buffer 15 and then detects the falling edge of the reception serial data (RxD). When the falling edge of the reception serial data (RxD) is detected in the second falling edge detection circuit 31, an output signal of high level is outputted from the second falling edge detection circuit 31 to the bit counter 32, the frame counter 33, the latch 34 and the first AND circuit 35. As a result, the bit counter 32, the frame counter 33 and the latch 34 are initialized and put into an operating condition and the first AND circuit 35 is put into an operating condition.

The bit counter 32 counts the number of pulses of the shift clock signal (SCK) received from the shift clock generation circuit 20 when it is in the operating condition and then outputs a first carry signal ($CA_1$) of high level each time it counts to "8" to detect that one of the first to third units of reception data $D_{R1}$-$D_{R3}$ each consisting of 8 bits has been fetched into the shift register 12. The first carry signal ($CA_1$) is outputted from the bit counter 32 to the frame counter 33 and the OR circuit 37.

The frame counter 33 counts the first carry signal ($CA_1$) received from the bit counter 32 when it is in operating condition and then outputs a second carry signal ($CA_2$) of high level each time it counts to "3" to detect that all of the first to third units of reception data $D_{R1}$-$D_{R3}$ have been fetched into the shift register 12. The second carry signal ($CA_2$) is outputted from the frame counter 33 to a clear terminal of the bit counter 32, a clear terminal of the frame counter 33 and the latch 34. As a result, when the second carry signal ($CA_2$) of high level is outputted from the frame counter 33, the bit counter 32 and the frame counter 33 stop their operations.

The latch 34 latches the second carry signal ($CA_2$) received from the frame counter 33 in response to a master clock signal (not shown in FIG. 5) received from the outside when it is in operating condition. In particular, when the second carry signal ($CA_2$) of high level is inputted from the frame counter 33 to the latch 34, the output signal, which is high level for only one period of the master clock signal, is outputted from the latch 34. The output signal of the latch 34 is sent to the central processing unit of the microcomputer as the interrupt requesting signal (INT) and is sent to the OR circuit 37 and a time base counter selection signal input terminal SELTBC' of second multiplexer 18 (refer to FIG. 3) as the time base counter selection signal (SELTBC). It is to be noted that the interrupt requesting signal (INT) is also sent to a set terminal S of the reset-set flip-flop 52 of the shift clock generation circuit 20 (refer to FIG. 4). The time base counter selection signal (SELTBC) is a signal for selecting the output signal of the shift register 12 or the output signal of the time base counter 17 as a signal to be fetched into the second multiplexer 18. Here, when the time base counter selection signal (SELTBC) is low level, the output signal of the shift register 12 is selected, but when the time base counter selection signal (SELTBC) is high level, the output signal of the time base counter 17 is selected.

The first AND circuit 35 generates a clear signal (CLR) for initializing the pointer 14. When the output signal of the second falling edge detection circuit 31 is high level and a master clock signal (C2) received from the outside is high level, the clear signal (CLR) of high level is outputted from the first AND circuit 35 to a clear terminal CLR' of the pointer 14 (refer to FIG. 3). The second AND circuit 36 and the OR circuit 37 are provided to generate an increment/write control signal (INC/WR) for incrementing an address of the reception buffer 11 designated by the pointer 14 and for writing the output signal of the second multiplexer 18 into the reception buffer 11. When at least one of the first carry signal ($CA_1$) outputted from the bit counter 32 and the time base counter selection signal (SELTBC) outputted from the latch 34 is high level and a master clock signal (C2) inputted from the outside to the second AND circuit 36 is high level, the increment/write control signal (INC/WR) of high level is outputted from the second AND circuit 36 to a write control signal input terminal WR of the reception buffer 11 and an increment control signal input terminal INC of the pointer 14.

The time base counter 17 shown in FIG. 3 is a counter which counts up by the clock signal (CLK) received from the outside and is used to effect the management of the reception time. The time base counter 17 is connected to the central processing unit through the data bus 21. The second multiplexer 18 fetches either one of the output signal of the shift register 12 and the output signal of the time base counter 17 in response to the time base counter selection signal (SELTBC) received from the control circuit 13. In particular, the second multiplexer 18 fetches the output signal of the shift register 12 when the time base counter selection signal (SELTBC) is low level, but fetches the output signal of the time base counter 17 when the time base counter selection signal (SELTBC) is high level. The reception buffer 11 writes the output signal of the second multiplexer 18 into an address indicated by the address signal inputted from the first multiplexer 16 to the address signal input terminal AD thereof when the increment/write control signal (INC/WR) inputted from the control circuit 13 to the write control signal input terminal WR thereof is high level. The pointer 14 designates an address of the reception buffer 11. The first multiplexer 16 fetches either one of the output signal of the pointer 14 and the address signal on the address bus 22 in response to a read-out control signal (RxBRD) received from the central processing unit. In particular, the first multiplexer 16 fetches the output signal of the pointer 14 when the read-out control signal (RxBRD) is low level, but fetches the address signal on the address bus 22 when the read-out control signal (RxBRD) is high level. It is to be noted that the reception buffer 11 is connected to the central processing unit through the data bus 21.

Next, the operation of the serial data reception circuit shown in FIG. 3 will be described.

The reception serial data (RxD) is first received in the input buffer 15 through the reception serial data input terminal 19 and then inputted to the shift clock generation circuit 20, the shift register 12 and the control circuit 13. When the falling edge of the reception serial data (RxD) is detected in the first falling edge detection circuit 51 of the shift clock generation circuit 20, the shift clock signal (SCK) synchronized with the reception serial data (RxD) is outputted from the shift clock generation circuit 20 to the control circuit 13 and the shift register 12 as described above.

When the falling edge of the reception serial data (RxD) is detected in the second falling edge detection circuit 31 of the control circuit 13; the bit counter 32, the frame counter 33 and the latch 34 are initialized thereby to effect the initialization of the communication control in the control circuit 13. The clear signal (CLR) of high level is outputted from the first AND circuit 35 of the control circuit 13 to the clear terminal CLR' of the pointer 14, and the pointer 14 is initialized by the clear signal (CLR). In the shift register 12, the reception serial data (RxD) is shifted one bit at a time in synchronism with the shift clock signal (SCK) so that the first unit of reception data $D_{R1}$ is fetched into the shift register 12.

After the first unit of reception data $D_{R1}$ is fetched into the shift register 12, the first carry signal ($CA_1$) of high level is outputted from the bit counter 32 of the control circuit 13 to the OR circuit 37 as shown in FIG. 6(b). As a result, the increment/write control signal (INC/WR) of high level is outputted from the second AND circuit 36 of the control circuit 13 to the write control signal input terminal WR of the reception buffer 11 and the increment control signal input terminal INC of the pointer 14 as shown in FIG. 6(f). The address of the reception buffer 11 designated by the pointer 14 is incremented in response to the increment/write control signal (INC/WR) of high level. In this instance, since the time base counter selection signal (SELTBC) of low level is outputted from the latch 34 to the second multiplexer 18, the second multiplexer 18 is in the condition wherein it fetches the output signal of the shift register 12. Accordingly, the reception circuit 11 writes the first unit of reception data $D_{R1}$ inputted thereto from the shift register 12 through the second multiplexer 18 to the address thereof designated by the address signal inputted from the pointer 14 to the address signal input terminal AD through the first multiplexer 16.

Thereafter, the second unit of reception data $D_{R2}$ and the third unit of reception data $D_{R3}$ are written from the shift register 12 into the reception buffer 11 in a similar manner as in the case of the first unit of reception data $D_{R1}$. After the third unit of reception data $D_{R3}$ has been written into the reception buffer 11, the second carry signal ($CA_2$) of high level is outputted from the frame counter 33 to the clear terminal of the bit counter 32, the clear terminal of the frame counter 33 and the latch 34 as shown in FIG. 6(c). As a result, the operation of the bit counter 32 and the frame counter 33 is stopped, and the time base counter selection signal (SELTBC) which is the output signal of the latch 34 is changed to high level as shown in FIG. 6(d). When the time base counter selection signal (SELTBC) of high level is inputted from the control circuit 13 to the second multiplexer 18, the second multiplexer 18 is put into the condition in which it fetches the output signal of the time base counter 17. Further, when the time base counter selection signal (SELTBC) of high level is inputted from the latch 34 of the control circuit 13 into the OR circuit 37, the increment/write control signal (INC/WR) of high level is outputted from the second AND circuit 36 to the pointer 14 as shown in FIG. 6(f) so that the address of the reception buffer 11 designated by the pointer 14 is incremented. Accordingly, the output signal (count value) of the time base counter 17 is inputted from the second multiplexer 18 to the reception buffer 11 and written into the address of the reception buffer 11 next to the address into which the third unit of reception data $D_{R3}$ has been written.

Since the time base counter 17 counts up by the clock signal (CLK), in the serial data transfer apparatus of the present embodiment, the count value of the time base counter 17 at the point of time when the reception of the reception serial data (RxD) is completed is written into the reception buffer 11 together with the reception data (the first to third units of reception data $D_{R1}$-$D_{R3}$). Accordingly, in the central processing unit, when the reception serial data (RxD) is to be processed, the time difference until the reception serial data (RxD) is processed can be detected by reading out the count value of the time base counter 17 written in the reception buffer 11 from the reception buffer 11 through the data bus 21 and reading out the count value of the time base counter 17 at present from the time base counter 17 through the data bus 21, and accordingly, time management of the reception data can be performed.

After the third unit of reception data $D_{R3}$ has been written into the reception buffer 11, the interrupt requesting signal (INT) of high level is inputted from the control circuit 13 to the set terminal S of the reset-set flip-flop 52 of the shift clock generation circuit 20 (refer to FIG. 4) so that the reset-set flip-flop 52 is set, and consequently, the operation of the serial clock counter 53 is stopped.

Next, a serial data transmission circuit of a serial data transfer apparatus according to a second embodiment of a serial data transfer apparatus of the present invention will be described with reference to FIGS. 7–10.

Figure 7:
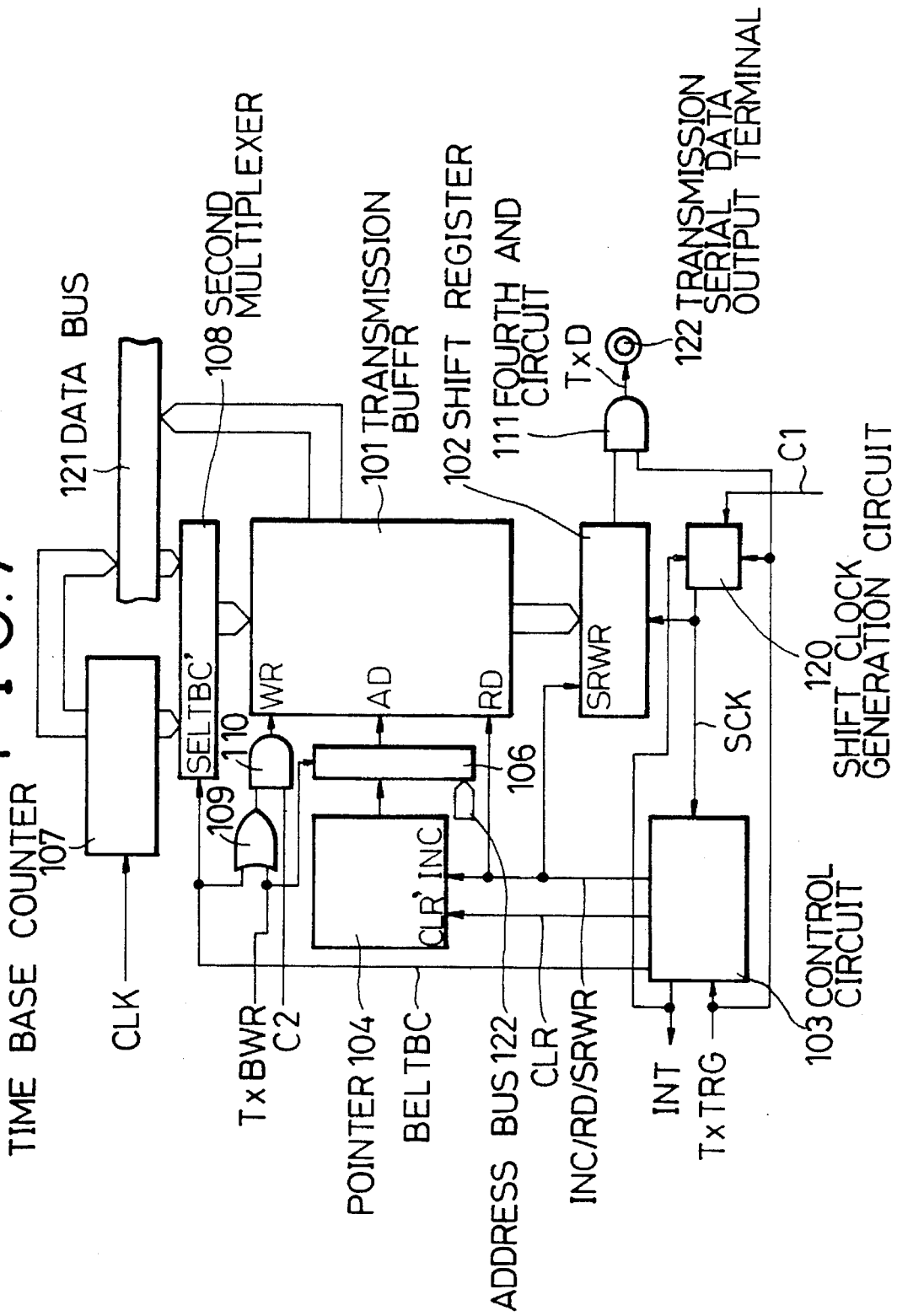
FIG. 7 is a block diagram showing a serial data transmission circuit illustrating a second embodiment of a serial data transfer apparatus of the present invention.

A serial data transmission circuit of a serial data transfer apparatus according to the second embodiment of the present invention includes, as shown in FIG. 7, a transmission buffer 101, a time base counter 107, a shift clock generation circuit 120, a control circuit 103, a shift register 102, a second multiplexer 108, a second OR circuit 109, a third AND circuit 110, a pointer 104, a first multiplexer 106, a fourth AND circuit 111, and a transmission serial data output terminal 112.

The transmission buffer 101 temporarily stores therein a transmission serial data (TxD) received from a central processing unit of a microcomputer (not shown in FIG. 7) through a data bus 121 and the output signal (count value) of the time base counter 107. It is to be noted that the transmission serial data (TxD) signifies serial data to be transmitted, and according to the protocol of the transmission serial data (TxD), as shown in FIG. 10(a), a falling edge of the transmission serial data (TxD) indicates the starting position of the serial data communication, and first to third transmission data $D_{T1}$-$D_{T3}$ each consisting of 8 bits are transferred serially following the falling edge. The period for which the first transmission data $D_{T1}$ consisting of 8 bits is transferred is called a first transmission frame $F_{T1}$; the period for which the second transmission data $D_{T2}$ consisting of 8 bits is transferred is called a second transmission frame $F_{T2}$; and the period for which the third transmission data $D_{T3}$ consisting of 8 bits is transferred is called a third transmission frame $F_{T3}$.

The time base counter 107 counts up by a clock signal (CLK) received from the outside and manages the transmission time. The time base counter 107 is connected to the central processing unit through the data bus 121.

Figure 8:
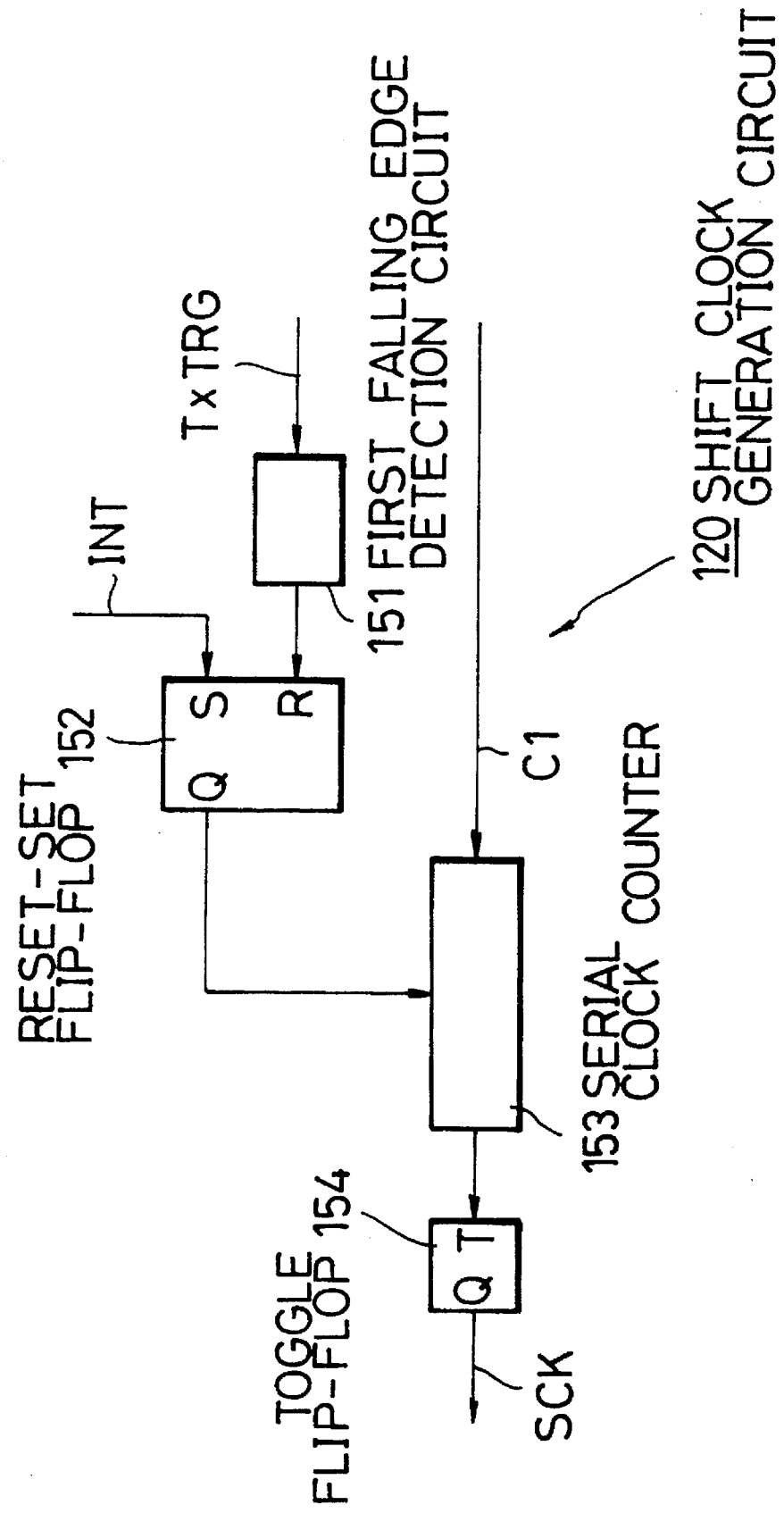
FIG. 8 is a block diagram showing the shift clock generation circuit shown in FIG. 7.

The shift clock generation circuit 120 generates a shift clock signal (SCK), which is indicative of a communication rate and synchronized with the transmission serial data (TxD), by using a system clock signal (C1) transmitted thereto from the outside. The shift clock generation circuit 120 includes, as shown in FIG. 8, a first falling edge detection circuit 151, a reset-set flip-flop 152, a serial clock counter 153, and a toggle flip-flop 154. The first falling edge detection circuit 151 detects the falling edge of a transmission starting signal (TxTRG) (refer to FIG. 10(h)) received from the central processing unit. The reset-set flip-flop 152 is set by an interrupt requesting signal (INT) inputted to a set terminal S thereof from the control circuit 103 and is reset by a signal inputted to a reset terminal R thereof from the first falling edge detection circuit 151. The serial clock counter 153 counts the number of pulses of the system clock signal (C1) received from the outside when the output signal of the reset-set flip-flop 152 transmitted to the reset terminal thereof is low level. It is to be noted that, since the output signal of the reset-set flip-flop 152 is normally high level, the serial clock counter 153 is in a reset state and held stopped from operation. The toggle flip-flop 154 reverses the polarity of the output signal thereof each time the output signal of the serial clock counter 153 transmitted to a toggle terminal T thereof changes from low level to high level.

When the falling edge of the transmission starting signal (TxTRG) is detected in the first falling edge detection circuit 151, the reset-set flip-flop 152 is reset by the output signal of the first falling edge detection circuit 151 so that the output signal of the reset-set flip-flop 152 changes to low level. Consequently, the serial clock counter 153 starts counting the number of pulses of the system clock signal (C1). After the number of pulses of the system clock signal (C1) corresponding to the length of a half bit of the transmission serial data (TxD) is counted, the output signal (carry signal) of high level is outputted from the serial clock counter 153 to the toggle terminal T of the toggle flip-flop 154 so that the polarity of the output signal of the toggle flip-flop 154 is reversed. After the serial clock counter 153 counts the number of pulses of the system clock signal (C1) corresponding to the length of a half bit of transmission serial data (TxD), the output signal (carry signal) of high level is outputted from the serial clock counter 153 to the toggle terminal T of the toggle flip-flop 154 so that the polarity of the output signal of the toggle flip-flop 154 is reversed. As the operation is repeated, the shift clock signal (SCK) synchronized with the transmission serial data (TxD) and having one pulse for each one bit of the transmission serial data (TxD) is generated.

Figure 9:
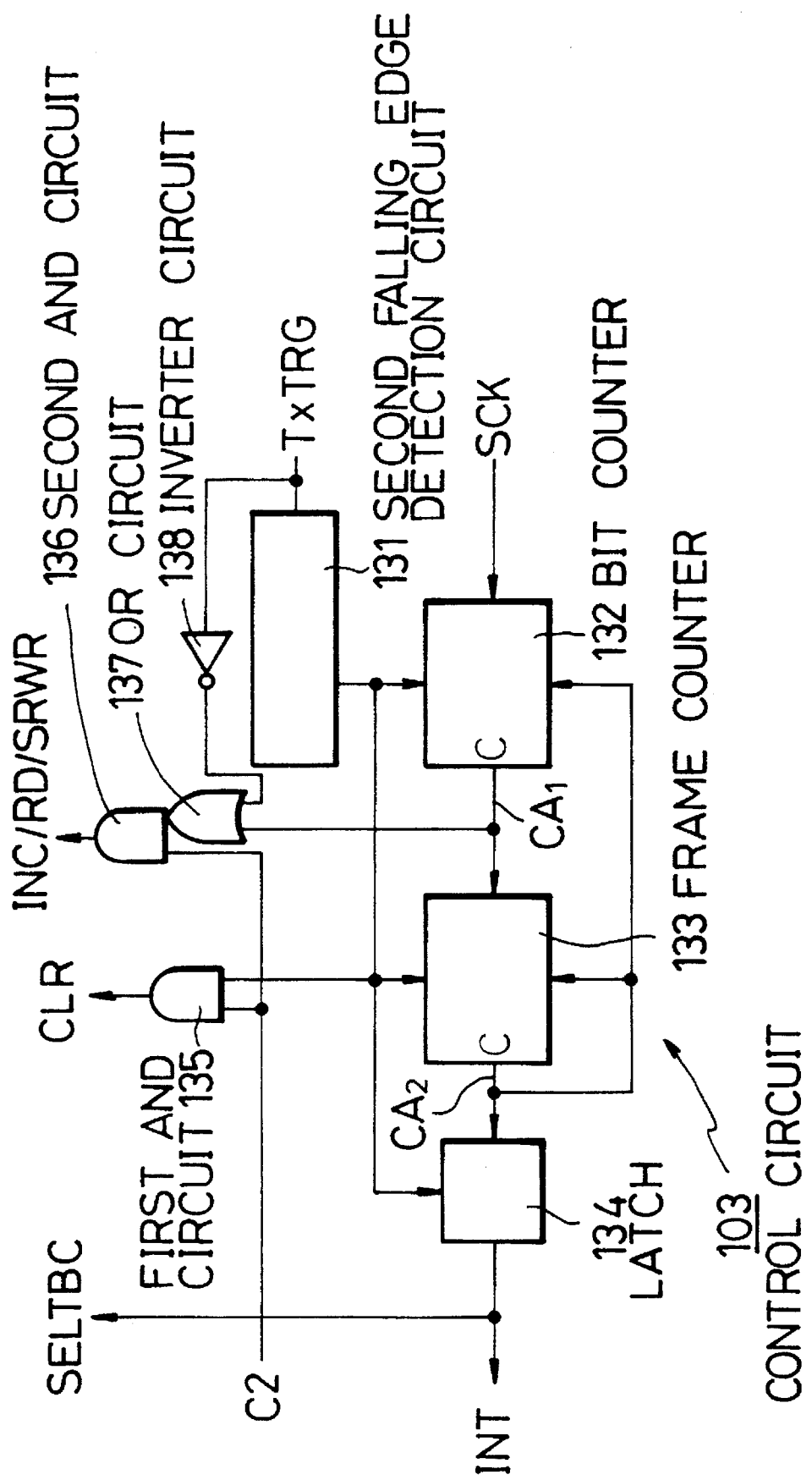
FIG. 9 is a block diagram showing the control circuit shown in FIG. 7.
Figure 10:
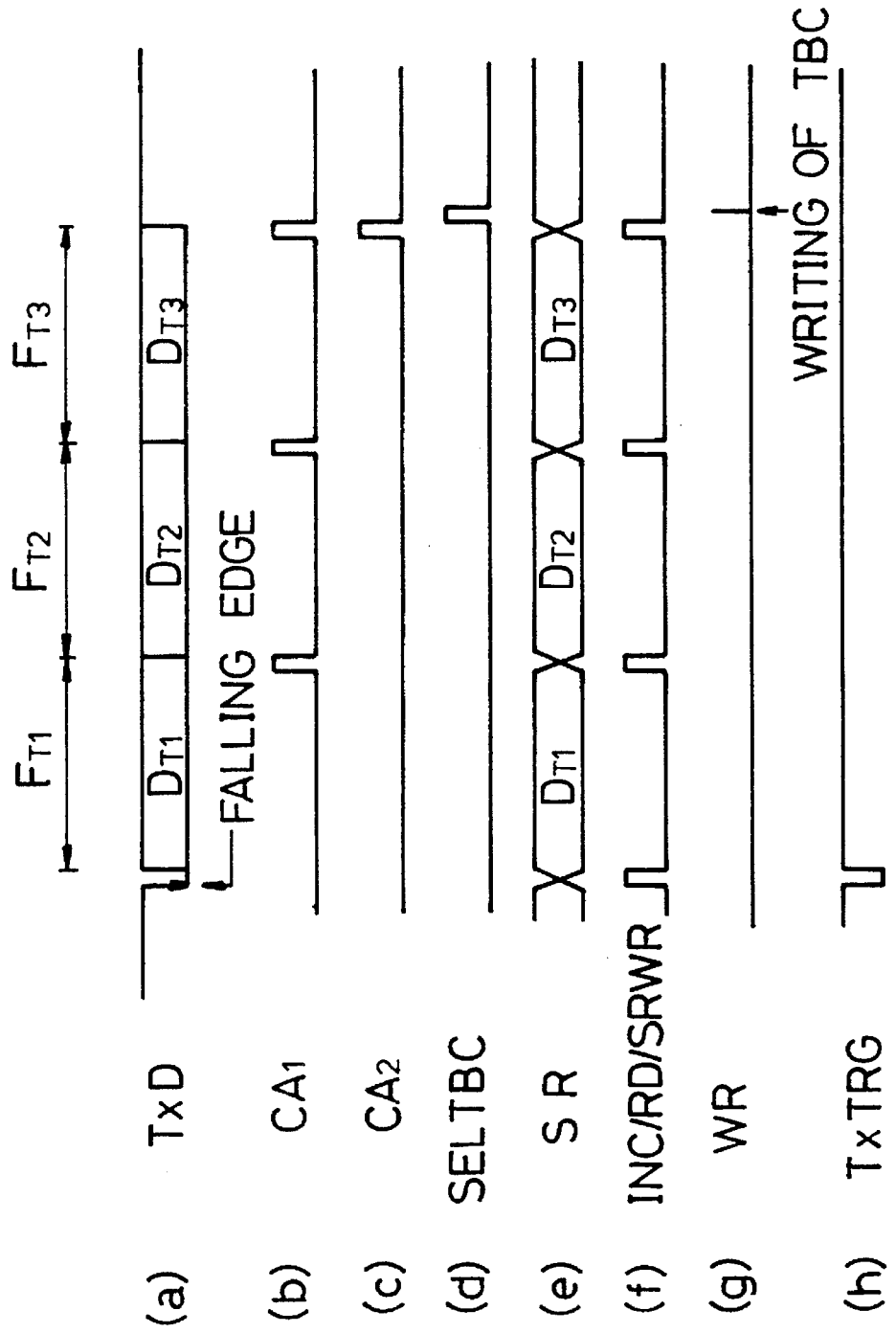
FIG. 10 is a timing chart illustrating operation of the serial data transmission circuit shown in FIG. 7.

The control circuit 103 includes, as shown in FIG. 9, a second falling edge detection circuit 131, a bit counter 132, a frame counter 133, a latch 134, a first AND circuit 135, a second AND circuit 136, an OR circuit 137 and an inverter circuit 138. The second falling edge detection circuit 131 receives the transmission starting signal (TxTRG) from the central processing unit and detects the falling edge of the transmission starting signal (TxTRG). When the falling edge of the transmission starting signal (TxTRG) is detected in the second falling edge detection circuit 131, the output signal of high level is outputted from then second falling edge detection circuit 131 to the bit counter 132, the frame counter 133, the latch 134 and the first AND circuit 135. As a result, the bit counter 132, the frame counter 133 and the latch 134 are initialized and put into operating condition while the first AND circuit 135 is put into operating condition. When the bit counter 132 is in operating condition, it counts the number of pulses of the shift clock signal (SCK) received from the shift clock generation circuit 120 and outputs a first carry signal ($CA_1$) of high level each time it counts to "8" to detect that each of the first to third transmission data $D_{T1}$-$D_{T3}$ each consisting of 8 bits has been fetched into the shift register 102 (refer to FIG. 10(b)). The first carry signal ($CA_1$) is outputted from the bit counter 132 to the frame counter 133 and the OR circuit 137. When the frame counter is in operating condition, it counts the first carry signal ($CA_1$) received from the bit counter 132 and outputs the second carry signal ($CA_2$) of high level each time it counts to "3" to detect that all of the first to third transmission data $D_{T1}$-$D_{T3}$ have been fetched into the shift register 102 (refer to FIG. 10(c)). The second carry signal $CA_2$ is outputted from the frame counter 133 to the clear terminal of the bit counter 132, the clear terminal of the frame counter 133 and the latch 134. As a result, when the second carry signal $CA_2$ of high level is outputted from the frame counter 133, the bit counter 132 and the frame counter 133 stop their operations. The latch 134 latches the second carry signal $CA_2$ received from the frame counter 133 in response to a master clock signal (not shown in FIG. 9) received from the outside when it is in operating condition. In particular, when the second carry signal $CA_2$ of high level is inputted from the frame counter 133 to the latch 134, the output signal, which is high level for only one period of the master clock signal, is outputted from the latch 134. The output signal of the latch 134 is sent to the central processing unit as the interrupt requesting signal (INT) and sent to the time base counter selection signal input terminal SELTBC' of the second multiplexer 108 and the second OR circuit 109 (refer to FIG. 7) as the time base counter selection signal (SELTBC). It is to be noted that the interrupt requesting signal (INT) is outputted also to the set terminal S of the reset-set flip-flop 152 of the shift clock generation circuit 120. The time base counter selection signal (SELTBC) is a signal for selecting one of the signals on the data bus 121 and the output signal of the time base counter 107 as a signal to be fetched into the second multiplexer 108 and is also a signal for writing the output signal of the second multiplexer 108 into the transmission buffer 101. Here, when the time base counter selection signal (SELTBC) is low level, the signal on the data bus 121 is selected, but when the time base counter selection signal (SELTBC) is high level, the output signal of the time base counter 107 is selected. Further, when the time base counter selection signal (SELTBC) is high level, the output signal of the second multiplexer 108 is written into the transmission buffer 101.

The first AND circuit 135 generates a clear signal (CLR) for initializing the pointer 104. When the output signal of the second falling edge detection circuit 131 is high level and the master clock signal C2 received from the outside is high level, the clear signal (CLR) of high level is outputted from the first AND circuit 135 to a clear terminal CLR' of the pointer 104. The second AND circuit 136, the OR circuit 137 and the inverter circuit 138 are provided to generate an increment/read-out/write control signal (INC/RD/SRWR). Here, the increment/read-out/write control signal (INC/RD/SRWR) is a signal for incrementing an address of the transmission buffer 101 designated by the pointer 104, putting the transmission buffer 101 into a read enabled condition and putting the shift register 102 into a write enabled condition. The transmission starting signal (TxTRG) is inputted to the OR circuit 137 after the polarity thereof is reversed in the inverter circuit 138. Accordingly, when at least one of the reversed transmission starting signal (TxTRG) and the first carry signal $CA_1$ outputted from the bit counter 132 is high level and the master clock signal C2 inputted from the outside to the second AND circuit 136 is high level, the increment/read-out/write control signal (INC/RD/SRWR) of high level is outputted from the second AND circuit 136 to an increment control terminal INC of the pointer 14, a read-out control signal input terminal RD of the transmission buffer 101 and a write control signal input terminal SRWR of the shift register 102.

The second multiplexer 108 shown in FIG. 7 fetches either the transmission data (the first to third transmission data $D_{T1}$-$D_{T3}$) outputted from the central processing unit into the data bus 121 or the output signal of the time base counter 107 in response to the time base counter selection signal (SELTBC) received from the control circuit 103. In particular, when the time base counter selection signal (SELTBC) is high level, the second multiplexer 108 fetches the output signal of the time base counter 107, but when the time base counter selection signal (SELTBC) is low level, the second multiplexer 108 fetches the transmission data on the data bus 121. The second OR circuit 109 logically ORs the time base counter selection signal (SELTBC) received from the control circuit 103 and a CPU write signal (TxBWR) received from the central processing unit. Further, the third AND circuit 100 logically ANDs the output signal of the second OR circuit 109 and the master clock signal C2 received from the outside, and the output signal of the third AND circuit 100 is inputted to a write control signal input terminal WR of the transmission buffer 101. Accordingly, when at least one of the time base counter selection signal (SELTBC) and the CPU write signal (TxBWR) is high level and the master clock signal C2 is high level, the write control signal of high level is inputted from the third AND circuit 110 to the write control signal input terminal WR of the transmission buffer 101.

The pointer 104 designates an address of the transmission buffer 101. The first multiplexer 106 fetches either the address signal outputted from the central processing unit into an address bus 122 or the output signal of the pointer 104 in response to the CPU write signal (T×BWR) received from the central processing unit. In particular, the first multiplexer 106 fetches the output signal of the pointer 104 when the CPU write signal (T×BWR) is low level but fetches the address signal on the address bus 122 when the CPU write signal (T×BWR) is high level. The output signal of the first multiplexer 106 is transmitted to the address signal input terminal AD of the transmission buffer 101. The fourth AND circuit 111 logically ANDs the transmission starting signal (T×TRG) received from the central processing unit and the output signal of the shift register 102.

Next, the operation of the serial data transmission circuit shown in FIG. 7 will be described.

The transmission serial data (the first to third transmission data $D_{T1}$-$D_{T3}$) is inputted from the central processing unit to the second multiplexer 108 through the data bus 121. The CPU write signal (T×BWR) of low level is inputted from the central processing unit to the third AND circuit 110, and an address signal is inputted from the central processing unit to the first multiplexer 106 through the address bus 122. In this instance, the time base counter selection signal (SELTBC) is low level. Accordingly, the transmission serial data (the first to third transmission data $D_{T1}$-$D_{T3}$) is written into the address of the transmission buffer 101 designated by the address signal.

The CPU write signal (T×BWR) is changed from low level to high level, and the transmission starting signal (T×TRG) is changed from high level to low level. As a result, when the falling edge of the transmission starting signal (T×TRG) is detected in the first falling edge detection circuit 151 of the shift flock generation circuit 120, the shift clock signal (SCK) synchronized with the transmission serial data (T×D) is outputted from the shift clock generation circuit 120 to the control circuit 103 and the shift register 102 as described above. The clear signal (CLR) of high level is outputted from the control circuit 103 to the pointer 104 to initialize the pointer 104, and the output signal of the fourth AND circuit 111 is changed to low level so that the falling edge of the transmission serial data (T×D) indicative of the starting of transmission is formed as shown in FIG. 10(a). Thereafter, the increment/read-out/write control signal (INC/RD/SRWR) outputted from the control circuit 103 is changed to high level as shown in FIG. 10(f), and the first transmission data $D_{T1}$ is read out from the address designated by the pointer 104 of the transmission buffer 101 and written into the shift register 102. The first transmission data $D_{T1}$ written in the shift register 102 is shifted one bit at a time in synchronism with the shift clock signal (SCK) and outputted serially to the fourth AND circuit 111, after which it is outputted from the fourth AND circuit 111 to the outside through the serial data output terminal 112.

After the first transmission data $D_{T1}$ is transmitted, the increment/read-out/write control signal (INC/RD/SRWR) is changed to high level as shown in FIG. 10(f), and the second transmission data $D_{T2}$ is read out from the transmission buffer 101 and written into the shift register 102. The second transmission data $D_{T2}$ is transmitted in a similar manner to the case of the first transmission data $D_{T1}$. After the second transmission data $D_{T2}$ is transmitted, the increment/read-out/write control signal (INC/RD/SRWR) is changed to high level as shown in FIG. 10(f), and the third transmission data $D_{T3}$ is read out from the transmission buffer 101 and written into the shift register 102. The third transmission data $D_{T3}$ is transmitted in a similar manner to the case of the first transmission data $D_{T1}$.

After the transmission of the third transmission data $D_{T3}$ is completed, the time base counter selection signal (SELTBC) is changed to high level as shown in FIG. 10(d). As a result, the count value of the time base counter 107 is selected by the second multiplexer 108, and the output signal of high level is inputted from the third AND circuit 100 to the write control signal input terminal WR of the transmission buffer 101 as shown in FIG. 10(g). Consequently, the count value of the time base counter 107 is written into the address of the transmission buffer 101 following the address into which the third transmission data $D_{T3}$ has been written. Accordingly, in the serial data transmission circuit, since the count value of the time base counter 107 at the point of time when the transmission of the transmission serial data is completed is written into the transmission buffer 101 following the transmission serial data, the central processing unit can recognize the count value of the time base counter 107 upon the transmission of the transmission serial data. As a result, upon the production of transmission serial data to be transmitted next, by reading out the count value of the time base counter 107 written in the transmission buffer 101 from the transmission buffer 101 through the data bus 122 and reading out the count value of the time base counter 107 regarding the transmission serial data to be transmitted next from the time base counter 107 through the data bus 122, the central processing unit can effect a comparison of the two count values and execute the predetermined processing in accordance with the difference between the count values, that is, the time difference, and accordingly, time management of the transmission serial data can be performed.

After the transmission of the third transmission data $D_{T3}$ is completed, the interrupt requesting signal (INT) of high level is inputted from the control circuit 103 to the set terminal S of the reset-set flip-flop 152 of the shift clock generation circuit 120 so that the reset-set flip-flop 152 is set, and consequently, the operation of the serial clock counter 153 is stopped.

While this invention has been described in conjunction with preferred embodiments thereof, it will now readily be possible for one skilled in the art to put this invention into practice in various other manners.

What is claimed is:

1. A serial data transfer apparatus, comprising:
 a) a serial data reception circuit including:
  1) means for receiving serial data in accordance with predetermined rules; and
  2) means for determining a reception time of the serial data, the determining means including:
   i) counting means having a count value which is incremented in synchronization with an internal clock running independently of serial data transfer control;
   ii) storage means into which the count value of the counting means and the serial data are stored; and
   iii) control means for controlling writing of the storage means so that the count value of the counting means is written into the storage means in a predetermined relationship to the serial data written in the storage means after all of the serial data is written into the storage means.

2. The apparatus of claim 1, wherein the serial data includes:

a falling edge indicative of a starting position of a serial data communication; and a set of data units, each of which consists of a predetermined number of bits, to be transferred serially following the falling edge.

3. A serial data transfer apparatus comprising:

a) a serial data transmission circuit including:
1) means for transmitting serial data in accordance with predetermined rules; and
2) means for determining a transmission time of serial data, including:
i) counting means having a count value which is incremented in synchronization with an internal clock running independently of serial data transfer control;
ii) storage means into which the count value of the counting means and the serial data are stored; and
iii) control means for controlling writing of the storage means so that the count value of the counting means is written into the storage means in a predetermined relationship to the serial data written in the storage means after all of the serial data is written into the storage means.

4. The apparatus of claim 3, wherein the serial data includes:

a falling edge indicative of a starting position of a serial data communication; and a set of data units, each of which consists of a predetermined number of bits, to be transferred serially following the falling edge.

5. A serial data transfer apparatus comprising:

a) a serial data reception circuit including:
1) means for receiving serial data in accordance with predetermined rules; and
2) means for determining a reception time of serial data, including:
i) first counting means having a count value which is incremented in synchronization with a first internal clock running independently of serial data transfer control;
ii) first storage means into which the count value of the first counting means and the serial data are stored; and
iii) first control means for controlling writing of the first storage means so that the count value of the first counting means is written into the first storage means in a predetermined relationship to the serial data written in the first storage means after all of the serial data is written into the first storage means; and b) a serial data transmission circuit including:
1) means for transmitting serial data in accordance with second predetermined rules; and
2) means for determining a transmission time of serial data, including:
i) second counting means having a count value which is incremented in synchronization with a second internal clock running independently of serial data transfer control;
ii) second storage means into which the count value of the second counting means and the serial data are stored; and
iii) second control means for controlling writing of the second storage means so that the count value of the second counting means is written into the second storage means in a predetermined relationship to the serial data written in the second storage means after all of the serial data is written into the second storage means.

* * * * *